(12) United States Patent
Elder et al.

(10) Patent No.: US 8,985,044 B2
(45) Date of Patent: Mar. 24, 2015

(54) WATERTIGHT DOOR SYSTEM

(75) Inventors: John Elder, Belleville (CA); David Monk, Belleville (CA); John Storring, Belleville (CA); Scott Leigh, Belleville (CA); Doug Smith, Belleville (CA)

(73) Assignee: EMS-Tech Inc., Belleville, Ontario (CA)

( * ) Notice: Subject to any disclaimer, the term of this patent is extended or adjusted under 35 U.S.C. 154(b) by 174 days.

(21) Appl. No.: 13/542,267

(22) Filed: Jul. 5, 2012

(65) Prior Publication Data
US 2013/0008364 A1 Jan. 10, 2013

(30) Foreign Application Priority Data

Jul. 7, 2011 (CA) .................................. 2745544

(51) Int. Cl.
*B63B 43/30* (2006.01)
*B63B 27/22* (2006.01)
*B65G 21/00* (2006.01)

(52) U.S. Cl.
CPC ................. *B63B 43/30* (2013.01); *B63B 27/22* (2013.01); *B65G 21/00* (2013.01)
USPC .......................... 114/120; 114/202; 198/860.4

(58) Field of Classification Search
USPC .................................. 114/120, 202; 198/860.4
See application file for complete search history.

(56) References Cited

U.S. PATENT DOCUMENTS

| 2,271,952 | A | | 2/1942 | Raus |
| 3,601,268 | A | * | 8/1971 | Bethge et al. ............... 414/142.3 |
| 4,833,829 | A | | 5/1989 | Wilson |
| 5,392,900 | A | * | 2/1995 | Sandwall ................... 198/860.4 |

FOREIGN PATENT DOCUMENTS

| GB | 811020 | 3/1959 |
| WO | WO 2009/010074 A1 | 1/2009 |

* cited by examiner

*Primary Examiner* — Edwin Swinehart
(74) *Attorney, Agent, or Firm* — Flynn, Thiel, Boutell & Tanis, P.C.

(57) ABSTRACT

A watertight door system that provides for subdivision of cargo holds, and having a door frame assembly with a sliding door. Conveyor support stringers are movably connected to the sliding door and conveyor idlers are movably connected to and the conveyor support stringers. A linear actuator associated with the door frame assembly selectively actuates the door between an open and closed position, whereby actuation of the door by the hydraulic cylinder causes the conveyor support stringers to move with the door, and the conveyor idlers to be lowered without removal thereof. Belt side plugs are positioned on either side of the door frame assembly, and can move both inwardly against a conveyor belt edge and outwardly from the conveyor belt edge.

10 Claims, 4 Drawing Sheets

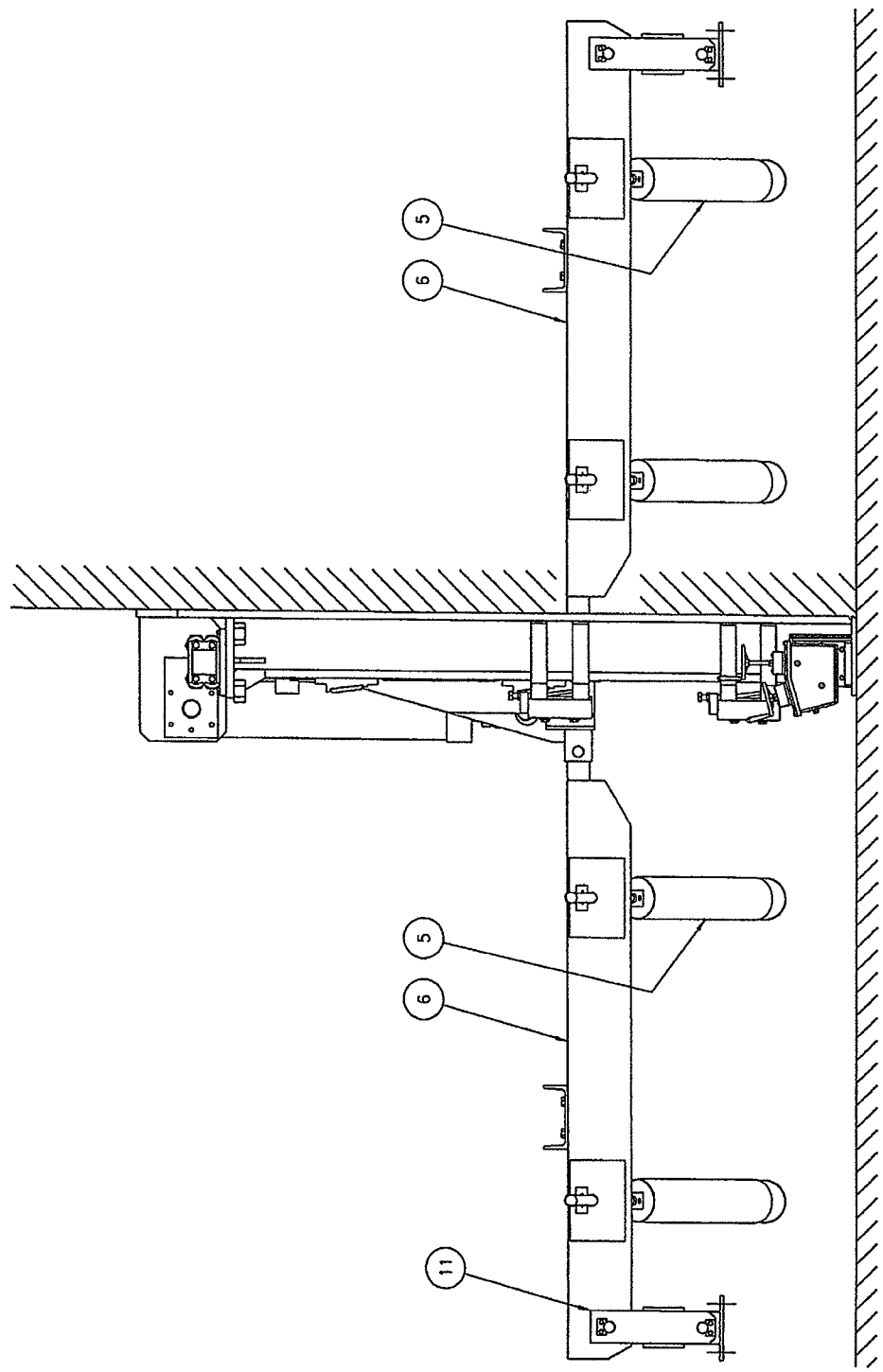

WATERTIGHT DOOR SYSTEM

The present invention relates to a watertight door system, or more particularly, to a watertight door system that provides for subdivision of cargo holds on a ship while minimizing complexity of operation.

BACKGROUND OF THE INVENTION

Watertight doors are an integral part of all ocean-going ships and this includes gravity type self-unloading ships. What makes these particular watertight doors different from most is that they must close the penetration through which the conveyor must pass. The complexity and size of the door can be rather considerable given: (1) the need for the doors to seal around both the carrying and return runs of the conveyor, and; (2) small leakage rates permitted by IACS, Solas, the regulatory bodies and as standardized in ASTM F1196. Several designs have been introduced by different companies over the years and, whilst functional, some designs tend to be rather complex in terms of ease of operation or mechanical content. Such complexity can require increased maintenance and also lead to a more rapid deterioration of components in one form or another.

In all cases, the conveyor is supported by idler rolls and these idler rolls are located adjacent to, and on both sides of, the watertight door. The conveyor idlers are typically supported on rigid structures called 'stringers' that run the length of the conveyor. The watertight door is opened prior to conveyor system start-up and prior to material being placed on the conveyor belt. The watertight door must be closed prior to the vessel leaving port to ensure adequate stability for safety at sea in the event that one of the cargo holds is breached and flooded. Depending upon the design of the watertight door, the conveyor belt can impose a significant force against the watertight door during closing operations and in a closed static case due to residual belt tensions. In the case of at least one watertight door design, a multiple of such conveyor idlers are required to be removed before the watertight door can be closed due to the external force imposed on the door from the belt. In some cases, a ship's crew is required to remove a number of conveyor idlers (typically three) on either side of the door (for a total of six), by hand, before the watertight door can be closed. This is obviously a time consuming and laborious chore.

It would therefore be advantageous to have an improved watertight door system wherein the conveyor belt tensions could be relieved automatically, by attaching a section of the adjoining conveyor support stringers on either side of the door, with those sections hinged to the watertight door, whereby actuation of the door causes the adjoining stringers to move with the door, and the associated conveyor idlers to be lowered out of the way without the removal thereof.

It would be further advantageous to have a watertight door system which can be opened and closed in an efficient, timely manner, and which is of a non-complex design that does not require a multitude of moving components or excessive preventative maintenance. To this end, the present invention effectively addresses this need.

SUMMARY OF THE INVENTION

The present invention provides an improved watertight door system wherein the conveyor idlers would be movable, through connection to adjoining conveyor support stringers hinged to the watertight door, whereby actuation of the door causes the adjoining stringers to move with the door, and the associated conveyor idlers to be lowered out of the way without the removal thereof by other means.

In a broad embodiment, the invention therefore seeks to provide an improved watertight door system which can be opened and closed in an efficient, timely manner, and which is of a non-complex design that does not require a multitude of moving components.

According to one aspect of an embodiment of the present invention, there is provided a water tight door for an opening in a bulkhead comprising a door frame assembly having a sliding door thereon; at least one conveyor support stringer connected to and movable with the sliding door; at least one conveyor idler connected to and movable with the at least one conveyor support stringer; and a linear actuator associated with the door frame assembly, for selectively actuating the door between an open and closed position, whereby actuation of the door by the hydraulic cylinder causes the at least one conveyor support stringer to move with the door, and the at least one conveyor idler to be lowered without removal thereof.

According to another aspect of an embodiment of the present invention, there is provided a water tight door for an opening in a bulkhead comprising a door frame assembly having a sliding door thereon; a set of at least two conveyor support stringers connected to and movable with the sliding door, the set of at least two conveyor support stringers being positioned on one side of the sliding door; another set of at least two conveyor support stringers connected to the sliding door, the another set of at least two conveyor support stringers being positioned on a second side of the sliding door; a plurality of conveyor idlers are connected to and movable with the set of at least two conveyor support stringers and with the another set of at least two conveyor support stringers; and a linear actuator associated with the door frame assembly, for selectively actuating the door between an open and closed position, whereby actuation of the door by the hydraulic cylinder causes the conveyor support stringers to move with the door, and the plurality of conveyor idlers to be lowered without removal thereof.

BRIEF DESCRIPTION OF THE DRAWINGS

The embodiments of the present invention will now be described by reference to the following figures, in which identical reference numerals in different figures indicate identical elements and in which:

FIG. 1B is a side view of the embodiment of the invention shown in FIG. 1A, illustrating the watertight door in an open position;

DETAILED DESCRIPTION OF THE INVENTION

Figure 1A:
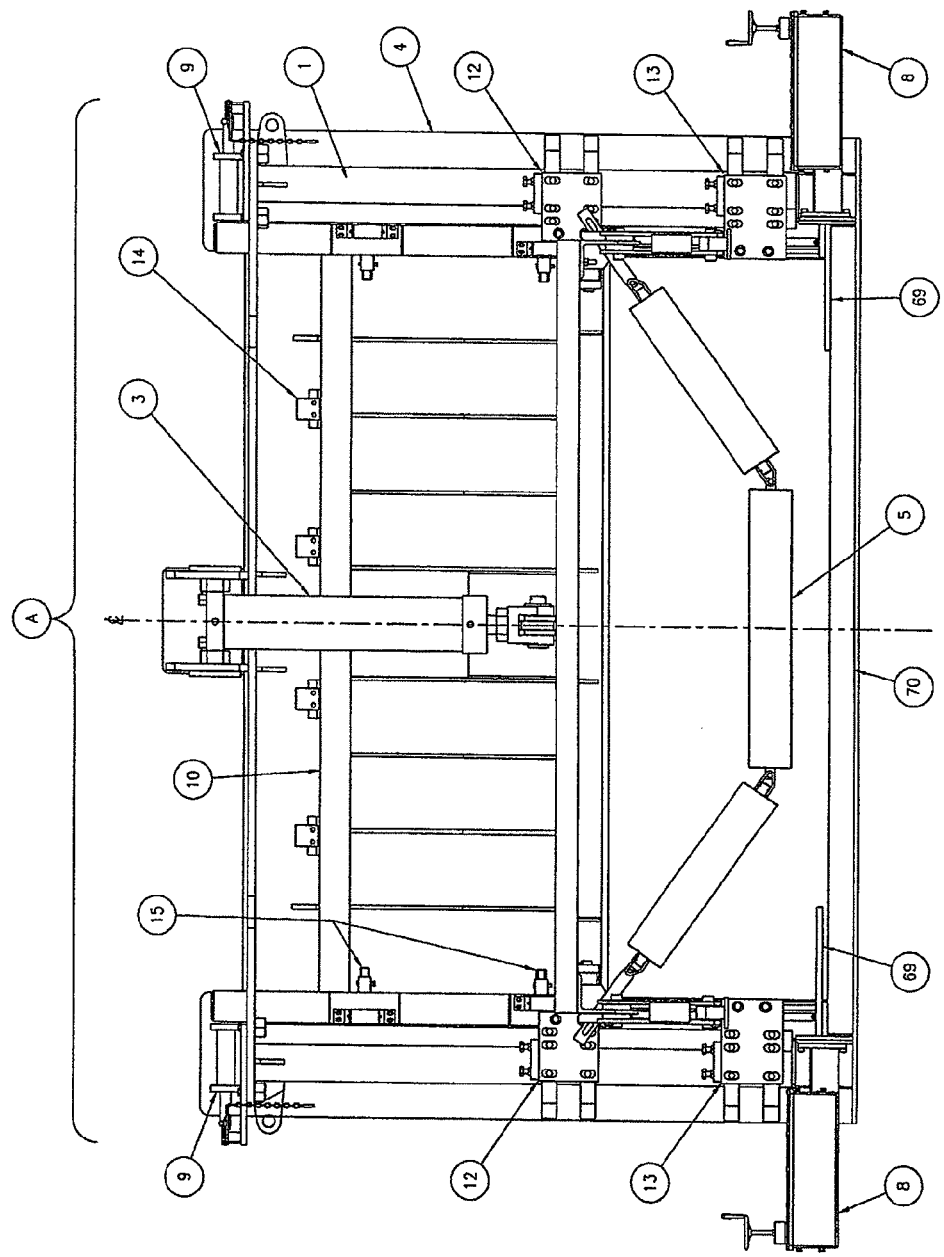
FIG. 1A is a front view of an embodiment of the invention, illustrating the watertight door in an open position.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Referring to FIGS. 1A to 2B, a first exemplary embodiment of the watertight door system 1 of the present invention is shown. Normally, of course, a suitably sized opening is cut in the bulkhead of the ship (not shown) and it is this bulkhead opening that must be sealed when the watertight door is closed.

The watertight door system 1 comprises a door frame assembly 4 which possesses a vertical sliding door 10 thereon. The door 10 itself can be moved from an open to a closed position by means of a linear actuator 3 (shown in FIGS. 1A and 2A) as a hydraulic cylinder) which is powered by the ship's electric, hydraulic or pneumatic system. Preferably, hydraulic system pressure is regulated so as to provide actuation of the door, and is typically controlled locally by a designated member of the ship's crew. Typically such doors are closed after completion of discharge and prior to vessel departure. They are opened upon vessel arrival at discharge port and prior to system start-up.

The door 10, when opened or closed, is guided to an open or closed position by adjustable guide posts 15, that follow along tracks (not shown) located on vertical frame members 2 positioned on either side of the door 10.

Conveyor support stringers 6 adjacent to the door are hinged at one end to the door 10 itself, the conveyor support stringers 6 having conveyor idlers 5 connected thereto, each of the conveyor idlers 5 being attached at each opposed end thereof to each of the conveyor support stringers 6. In a preferred embodiment, as seen in FIGS. 1B and 2B, there are two conveyor support stringers 6 positioned on one side of the door 10, each at opposite ends of the door 10, and there are likewise also two corresponding conveyor support stringers 6 on the opposite side of the door 10. Moreover, in a preferred embodiment, there are a plurality of conveyor idlers 5 connected to the conveyor support stringers 6. Moreover, each distal end of the conveyor support stringers 6 is pivotally connected to a simple linkage assembly 11, which is supported by a T-Bracket, that is in turn supported on the conveyor stringer assembly (not shown).

Figure 2A:
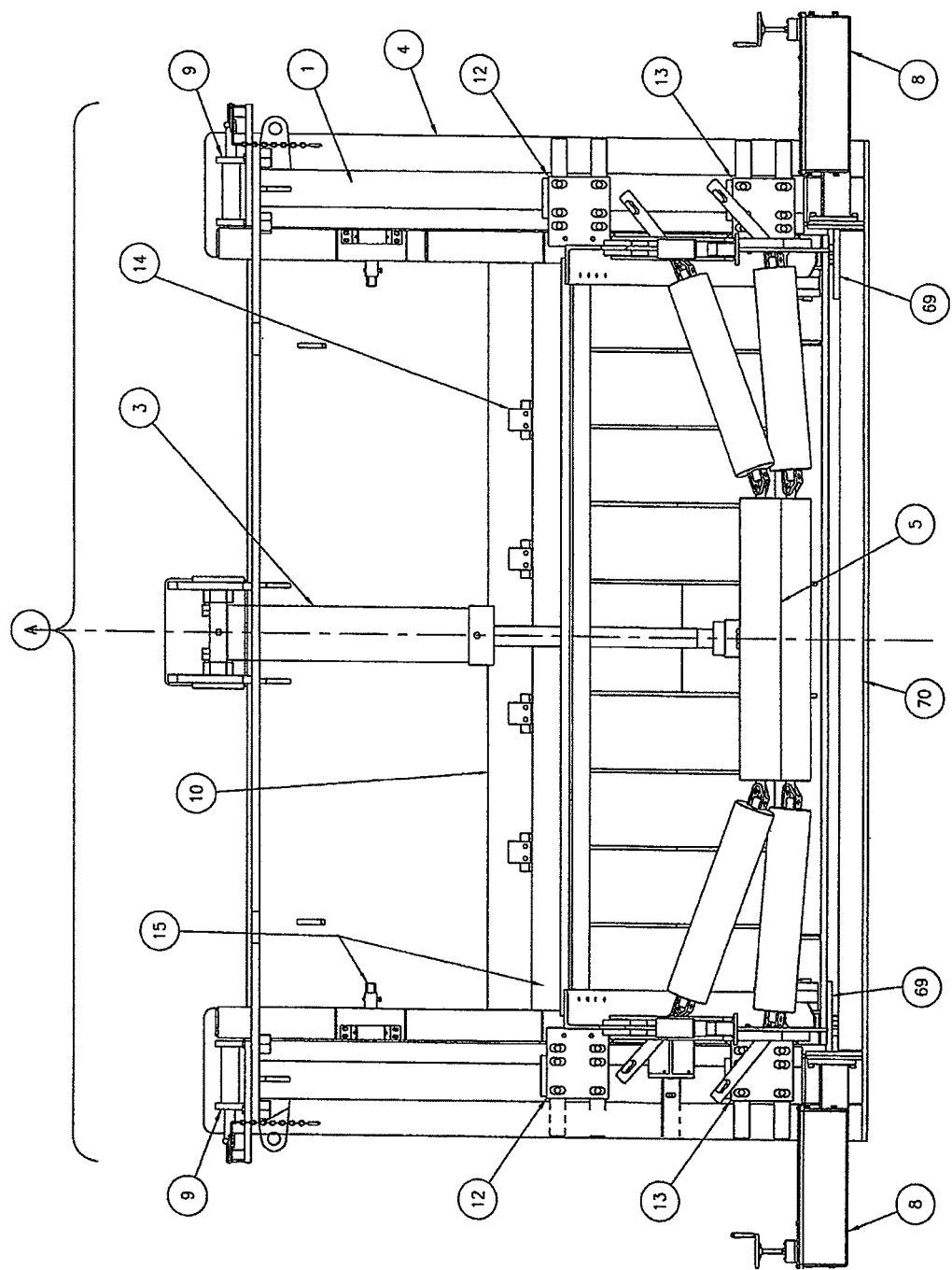
FIG. 2A is a front view of an embodiment of the invention, illustrating the watertight door in a closed position.
Figure 2B:
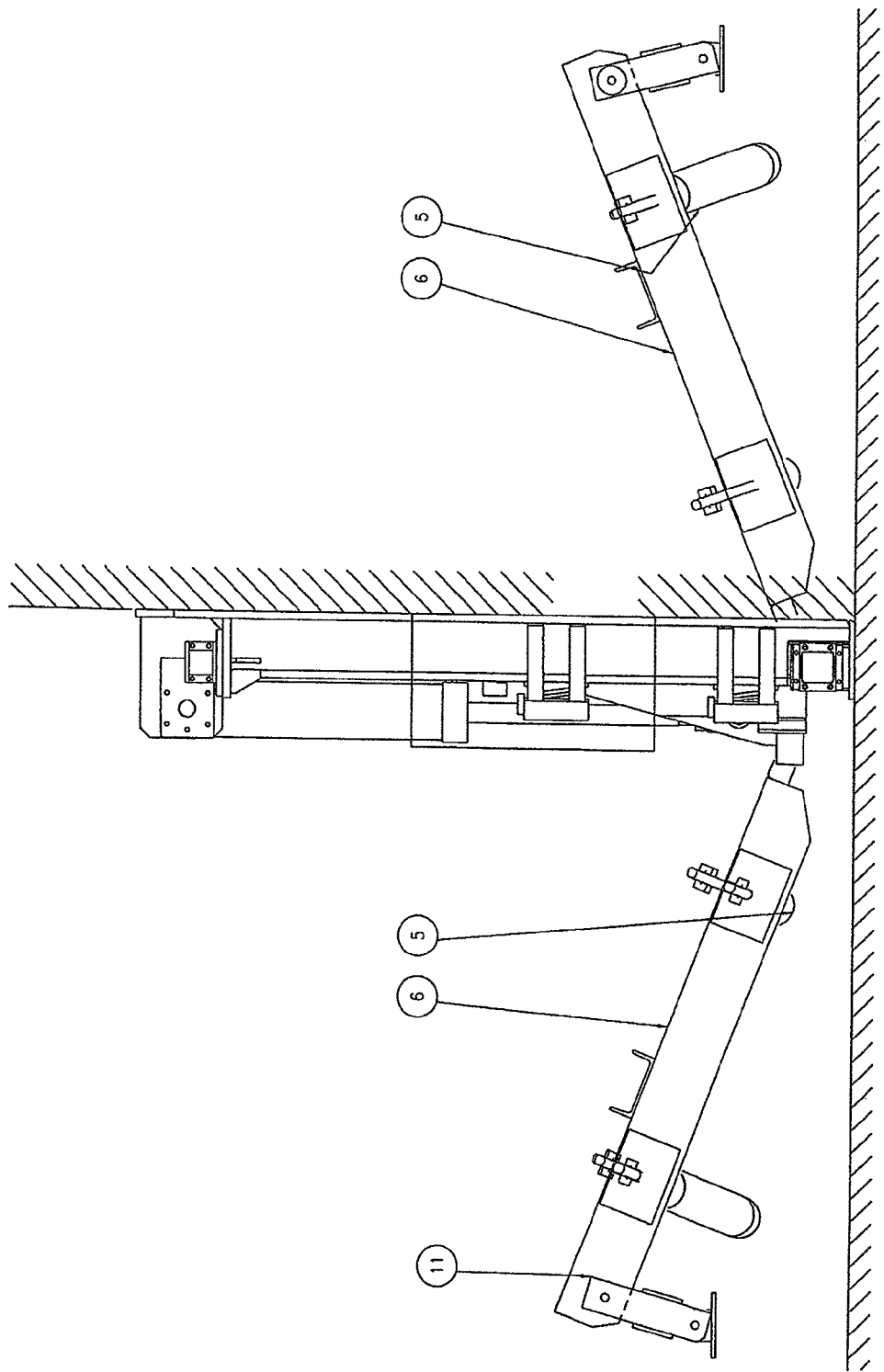
FIG. 2B is a side view of the embodiment of the invention shown in FIG. 2A, illustrating the watertight door in a closed position.

Twin hand wheel operated screw thread actuators 8 (mechanical in nature, as shown in FIG. 1A) are positioned on either side of the door frame assembly 4 and are utilized to independently control and move both carrying side and return side belt side plugs 69 into contact with the conveyor belt edges to minimize leakage at these points when the door 10 is in the closed position. The actuator for the belt side plugs can be screw type, as noted, but also can be hydraulic, mechanical, electrical or pneumatic in operation. As an example, an operator can actuate the cylinder 8, to cause an associated linkage (not shown) to move the belt plug 69 inwardly against the conveyor belt edge. Similarly, when the operator actuates the cylinder 8 the other way, this causes the belt plug 69 to move outboard clear of the conveyor belt edge.

In a preferred embodiment, there are two belt plugs 69 per side of the door frame assembly 4; one for the top (carrying) conveyor belt and one for the bottom (return) conveyor belt. Preferably, separate belt plugs 69 for the top and bottom belts are required, as these belts can be offset at the time of closure.

In operation, actuation of the door 10 causes the adjoining conveyor support stringers 6 to move with the door 10 and the associated conveyor idlers 5 are thus lowered to the vessel bottom deck plate (tank top). This action, in combination with a release of conveyor belt tension, is necessary to allow the door 10 to be able to push the two conveyor belt lines to the stool 70 that is located in line with the door immediately below the return belt line. Sealing of the doorway opening is achieved by compressing the two belts between the door and the stool 70. Sealing is achieved on the other three sides by face seal located between the machined faces on the sliding door and the watertight door frame.

As the vertical sliding door is lowered, the conveyor support stringers 6 are lowered, and the associated conveyor catenary type idlers 5 simply drop in unison and adjust to a neutral position when they strike the top surface of the return belt. Belt plugs 69 are run up against associated belt edges and the door 10 is finally closed tightly to provide watertightness along the bottom edge and three remaining surfaces. The crew member takes no further action in this regard and when it comes time to operate the conveyor system, the watertight door is opened which causes the conveyor support stringers 6 and supported conveyor idlers 5 to be raised back into operating position.

Other embodiments consistent with the present invention will become apparent from consideration of the specification and the practice of the invention disclosed therein. Accordingly, the specification and the embodiments are to be considered exemplary only, with the true scope and spirit of the invention being disclosed by the following claims.

We claim:

1. A door for an opening in a bulkhead comprising:
a door frame assembly having a sliding door thereon;
at least one conveyor support stringer connected to and movable with the sliding door;
at least one conveyor idler connected to and movable with the at least one conveyor support stringer; and
a linear actuator associated with the door frame assembly, for selectively actuating the door between an open and closed position,
whereby actuation of the door by the linear actuator causes the at least one conveyor support stringer to move with the door, and the at least one conveyor idler to be lowered without removal thereof.

2. The door of claim 1, wherein the linear actuator is mechanical, electric, pneumatic or a hydraulic cylinder.

3. The door of claim 1, further comprising vertical frame members positioned on either side of the sliding door.

4. The door of claim 3, wherein each of the vertical frame members further comprise a track positioned thereon.

5. The door of claim 4, wherein the sliding door is guided to an open or closed position by guide posts which extend along a respective track on the vertical frame members.

6. The door of claim 1, wherein the at least one conveyor support stringer is hingedly connected to the sliding door.

7. The door of claim 1, wherein the at least one conveyor support stringer comprises a first set of at least two conveyor support stringers connected to the sliding door, the first set of at least two conveyor support stringers being positioned on a first side of the sliding door.

8. The door of claim 7, wherein the at least one conveyor support stringer further comprises a second set of at least two conveyor support stringers connected to the sliding door, the second set of at least two conveyor support stringers being positioned on a second side of the sliding door.

9. The door of claim 8, wherein a plurality of conveyor idlers are connected to and movable with the first set of at least two conveyor support stringers and with the second set of at least two conveyor support stringers.

10. A door for an opening in a bulkhead comprising:
a door frame assembly having a sliding door thereon;

a set of at least two conveyor support stringers connected to and movable with the sliding door, the set of at least two conveyor support stringers being positioned on one side of the sliding door;

another set of at least two conveyor support stringers connected to the sliding door, the another set of at least two conveyor support stringers being positioned on a second side of the sliding door;

a plurality of conveyor idlers are connected to and movable with the set of at least two conveyor support stringers and with the another set of at least two conveyor support stringers; and a linear actuator associated with the door frame assembly, for selectively actuating the door between an open and closed position, whereby actuation of the door by the linear actuator causes the conveyor support stringers to move with the door, and the plurality of conveyor idlers to be lowered without removal thereof.

* * * * *